Dec. 6, 1932.    G. A. HARGREAVES    1,890,290
FIRE HOSE COUPLING
Filed Feb. 26, 1932
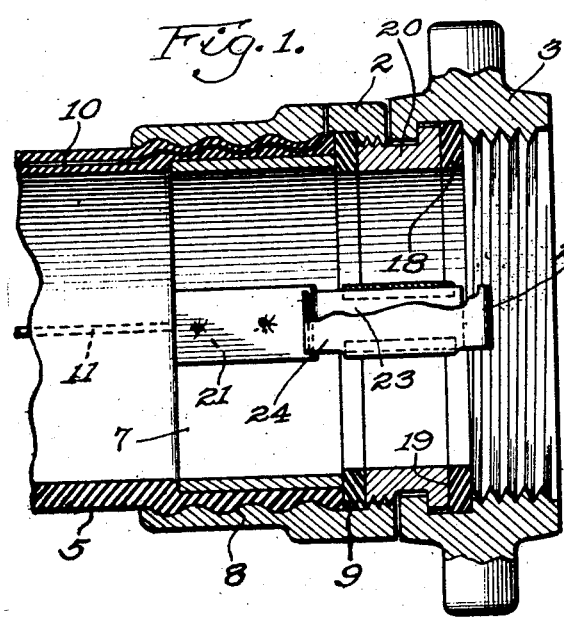
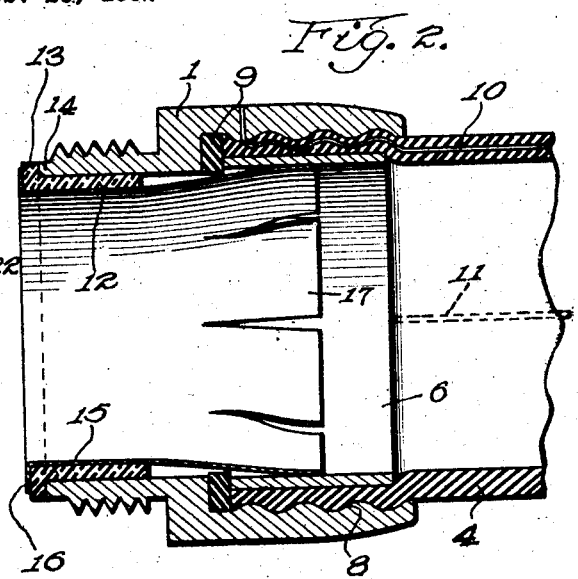
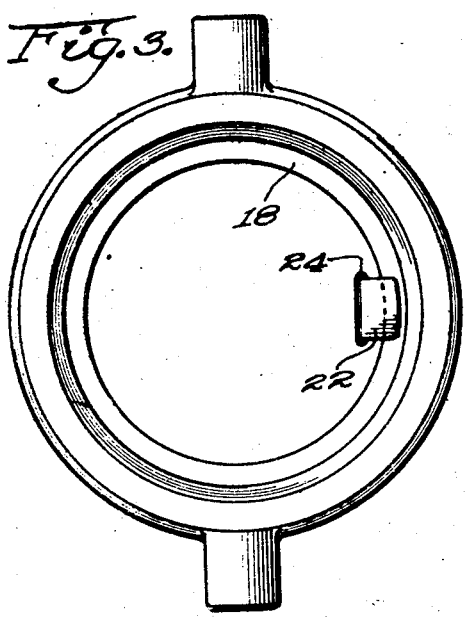
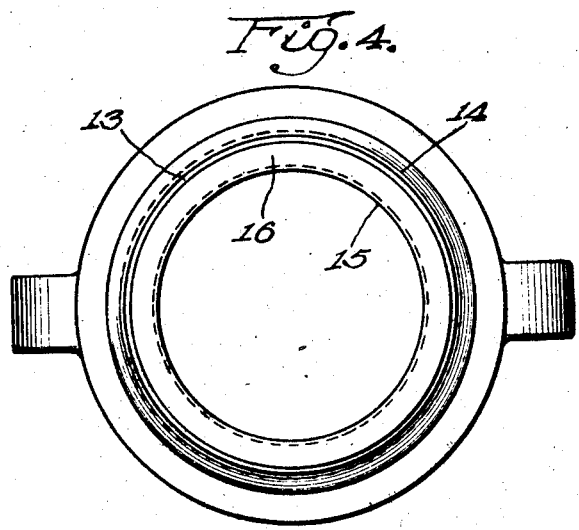
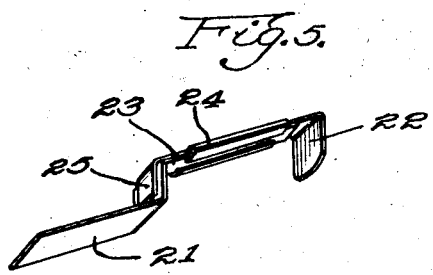
Inventor.
George Arthur Hargreaves.
Witness
Arthur M. Franke.

Patented Dec. 6, 1932

1,890,290

UNITED STATES PATENT OFFICE

GEORGE ARTHUR HARGREAVES, OF EVANSTON, ILLINOIS, ASSIGNOR OF ONE-HALF TO WILLIAM T. OWENS, OF EVANSTON, ILLINOIS

FIRE HOSE COUPLING

Application filed February 26, 1932. Serial No. 595,311.

The invention relates to fire hose couplings wherein electrical connections are automatically made, simultaneously with the coupling together of separate hose lengths, to provide an electric signal circuit within the body of the hose.

The main objects of this invention are to provide an improved electric terminal structure for hose couplings whereby proper electrical connections can be made regardless of the angular relation of the coupling parts when they are coupled together; to provide improved contacting means for electric connections that may be readily attached to existing hose to adapt the same to an electric signal system; to provide such contacting means that are readily removable for repair or replacement; to provide such contacts that are self-adjusting to compensate for wear and varying degrees of gasket compression in the hose connection.

A specific embodiment of this invention is shown in the accompanying drawing, wherein:

Figure 1 is a sectional view of the female half of an improved coupling, the contact member being shown partly in section.

Fig. 2 is a sectional view of the male half of the coupling.

Fig. 3 is a view showing the open end of the coupling member of Fig. 1.

Fig. 4 is a view showing the open end of the coupling member of Fig. 2.

Fig. 5 is a perspective view of the telescopic contacting finger showing its form and assembly.

In the form shown in the drawing, the improved hose coupling or union comprises a male part or threaded end 1, and a female part or socket end 2, the female part having mounted thereon a swivel or ring 3. Hose ends 4 and 5 are secured respectively in one end of each part of the coupling by means of the usual expansion rings 6 and 7, which clamp the same securely to the corrugated surface 8 on the interior of each coupling part.

As shown in Figs. 1 and 2, the hose ends 4 and 5 are inserted within each respective coupling part until each abuts an annular insulating ring 9. The ring 9, being made of any suitable dielectric material, serves to prevent any contact between the expansion rings 6 and 7 and the body of the respective coupling parts 1 and 2.

A pair of wires 10 and 11 are provided within the body of each hose 4 and 5, these wires serving as electric conduits along the hose to interconnect the metallic coupling parts which are secured to each end of the hose. The wires 10, as shown, are securely connected to the body of the respective coupling parts 1 and 2, and the wires 11 are connected to the respective expansion rings.

As shown in Fig. 2, the outer or open end of the male part 1 is provided with an annular sleeve 12, made of suitable dielectric material, which serves as a lining for the interior surface adjacent the open end. The sleeve 12 is provided with an annular radial flange 13 which abuts the annular shoulder or end edge 14 of the body of the male half of the coupling.

An annular metallic sleeve 15 is also disposed within the male part 1 of the coupling so as to tightly fit within the dielectric sleeve 12, and extends from the end edge 14 of the coupling body part to approximately the center of the expansion ring 6. The sleeve 15 is provided with an annular radial flange or contact member 16 which rests against the outer face of the flange 13, and the inner end 17 of the sleeve 15 is split and expanded to provide a pressure contact with the inner surface of the expansion ring 6.

As shown in Fig. 1, the female body part 2 of the coupling is provided with an annular dielectric gasket 18 which rests against the annular shoulder 19 provided by holding ring 20 which serves to retain the swivel 3.

A telescopic finger 21 is secured to the expansion ring 7 within the female part of the coupling and is positioned to extend axially within the coupling and forwardly from the respective expansion ring 7 to a point beyond the outer face of the gasket 18, where the finger is provided with a terminal means or radially projecting portion 22 which overlaps the outer face of the gasket 18.

As shown in Fig. 3, the finger 21 is arranged so as to be axially spaced from the holding ring 20, in order to bridge the same and thereby prevent any short circuit between the expansion ring 7 and the body part of the coupling.

As shown in Fig. 5, the finger 21 is formed to provide an offset portion 23 upon which is mounted a slidable extension element 24. The extension element 24 carries at one end the radially projecting portion or terminal 22 and at the other end a stop 25 to limit its forward movement.

In operation an electrical connection is made between the wires or conduits 10 at the instant the swivel or ring 3 is threaded upon the body portion 1 of the male part of the coupling, and the connection between wires or conduits 11 is completed as soon as the female body portion 2 is drawn sufficiently tight upon the male body portion 1 so that the radial flange or contact member 16 will abut the radially projecting terminal portion 22 of the finger 21 and the gasket 18. Since the flange 16 of the sleeve 15 is annular in form no consideration need be made of the angular relation of the coupling parts 1 and 2. In this manner, an electric or telegraphic hose may be rapidly connected up in exactly the same manner as though no electrical connections were to be made.

When it is desired to apply the contact members to existing non-electric hoses, it is merely necessary to secure the ends of the wires 10 and 11 to the respective coupling body and expansion ring, then secure the finger 21 to the expansion ring 7 within the female half of the coupling, and insert the contact sleeve 15 and the insulating sleeve 12 in the male portion of the coupling where they are held by surface friction, the inner end 17 of the sleeve 15 being previously split and formed so as to be self-expanding to contact the inner surface of the respective expansion ring 6.

The only parts comprising my improved coupling that might require replacement or repair are the sleeve 15 and the finger 21, and it is readily apparent that these parts can be easily removed and replaced.

The principal advantage of my improved coupling, aside from the readily attachable and removable contacting elements, lies in the telescopic contact finger 21 which serves to compensate for wear on the gasket 18 by readily contracting without causing any buckling or bending of that portion bridging the holding ring 20. Also, in order to serve as a suitable seal, the gasket 18 must be made of a relatively soft compressible material, and since the telescopic action of the finger 21 will permit the radially projecting terminal portion 22 to follow the outer surface of the gasket 18 as it is alternately compressed and expanded due to coupling and uncoupling the parts 1 and 2, a positive electrical interconnection between the expansion rings 6 and 7 is always assured.

Although but one specific embodiment of this invention has been herein shown and described, it will be understood that certain details of the construction shown may be altered or omitted without departing from the spirit of this invention as defined by the following claims.

I claim:

1. An electric hose coupling comprising male and female parts with an interposed gasket and having coacting contact members, one of said members being positioned adjacent the end of one of said parts and having a radially extending portion arranged to abut a face of said gasket, and the other of said members comprising an axially extending finger positioned within the other of said parts and having its forward portion turned radially and overlapping a face of said gasket, said finger comprising two elements slidable one upon the other to provide for axial compression and expansion of said gasket.

2. In an electric hose coupling comprising separable body parts, each having an internal expansion ring insulated from the respective body part and each having an annular shoulder arranged for abutment with the shoulder of the other part when said parts are coupled together, each of said parts respectively having electric leads connected to the body portion and to the expansion ring therein, an annular contact member disposed against the annular shoulder of one of said parts and having means extending axially within said part to contact the respective expansion ring, means to insulate said contact member from said body part, an axially extending finger secured to the expansion ring within said other body part and projecting outwardly beyond the respective annular shoulder of that part, terminal means on said finger overlapping the annular shoulder of said other part, means to insulate said finger and said terminal from said other body part, and means to secure said body parts in coupled relation.

3. In an electric hose coupling comprising male and female body parts each having an internal expansion ring insulated from the respective body part and each having electric leads secured respectively to the body part and to the expansion ring, an annular metallic sleeve disposed within said male part and having a flange overlapping the end edge of said part, said sleeve extending axially within said male part to contact the respective expansion ring, means to insulate said sleeve from said male body part, an annular dielectric gasket within said female body part, an axially extending finger secured to the expansion ring within said female part and projecting forwardly beyond said gasket, terminal means on said finger overlapping the outer face of said gasket, and means to secure said body parts together with the terminal means on said finger in abutment with the flange on said metallic sleeve.

4. An electric hose coupling comprising separable interfitting body parts each secured to an end of a respective hose section by means of respective internal expansion rings, an annular shoulder on each of said body parts each arranged for concentric abutment with the other when said body parts are in interfitting relation, an annular contact member on the shoulder of one of said body parts having means extending inwardly to contact the respective expansion ring of said part, means to insulate said contact member from said body part, a telescopic finger secured to the expansion ring of the other of said body parts and extending axially beyond the annular shoulder of said part, terminal means on said finger overlapping the annular shoulder of said other part, means to insulate said terminal means from said shoulder, and a pair of wires within each of the respective hose sections, one of said wires being connected to a respective body part and the other to a respective expansion ring.

5. An electric hose coupling comprising separable interfitting body parts each secured on a respective hose end by means of respective internal expansion rings, each of the hoses having a pair of wires therein, one of which is secured to the respective body part and one of which is secured to the respective expansion ring, a radially extending contact member disposed at the end edge of one of said body parts having means extending axially within said body part to contact the respective expansion ring, means to insulate said contact member from said body part, an annular dielectric gasket on the other of said body parts, contact means overlapping the outer face of said gasket and extending inwardly within said other body part to contact its respective expansion ring, and means to secure said body parts in interfitting relation such that said contact members are in abutment with each other.

6. In an electric hose coupling comprising male and female body parts each having an internal expansion ring insulated from the respective body part and each having electric leads secured respectively to the body part and to the expansion ring, an annular contact member on said male part radially overlapping the end edge thereof and insulated therefrom and having means extending to contact the respective expansion ring, an annular dielectric gasket within said female part, and an axially extending telescopic finger secured to the expansion ring within said female part and having a radially extending projection overlapping said gasket to contact with said annular contact member when said body parts are coupled together.

7. An electric hose coupling comprising male and female body parts, an expansion ring within each of said parts, said expansion rings being insulated from the respective rings, an annular contacting member body parts, an annular contacting member disposed adjacent the open end edge of said male part having means extending axially of said male part to contact the respective of said ring, means insulating said contact member from said male part, an annular dielectric gasket within said female part, an axially extending finger secured to the expansion ring within said female part and extending forwardly beyond said gasket, said finger being spaced from the inner surface of said female part and having a radially extending projection overlapping said gasket, a pair of wires leading from each of said body parts respectively, one wire being secured to the body part and the other to the expansion ring within said part, and means to secure said body parts together such that said finger will contact said annular contacting member.

8. In an electric hose coupling comprising male and female parts each secured to an end of respective hoses by means of internal expansion rings, each of said hoses including a pair of wires one of which is connected to the respective coupling part and the other to the respective expansion ring, a dielectric sleeve within said male part having an annular radially projecting flange on one end abutting the end edge of said male part, a metallic ring on the outer face of said flange having means extending axially into said male part to contact the respective expansion ring, an annular dielectric gasket within said female part, a metallic finger secured to the expansion ring within said female part and projecting outwardly therefrom, said finger having terminal means at its outward end overlapping the outward face of said gasket, and means to secure said male and female parts together, the ring on the flange of said sleeve contacting the terminal means of said finger.

9. In an electric hose coupling comprising threaded male and female body parts, a hose end secured within each part by means of respective metallic expansion rings, a non-conducting sleeve disposed in said male part and having a radial flange abutting the edge of the open end of said male part, a metallic ring on the outer end surface of said flange having means extending within said male part to contact the respective expansion ring, a non-conducting gasket within said female part, a telescopic finger extending forwardly from the female part expansion ring and having a radially extending portion overlapping said gasket, and a pair of wires within each of the hoses connected respectively to the body part and the expansion ring.

Signed at Chicago in the County of Cook and State of Illinois this 29th day of January, 1932.

GEORGE ARTHUR HARGREAVES.